US008635692B2

(12) United States Patent
Gentner et al.

(10) Patent No.: US 8,635,692 B2
(45) Date of Patent: Jan. 21, 2014

(54) SYSTEM AND METHOD FOR USER FRIENDLY DETECTION OF SPAMMERS

(75) Inventors: Nathan Gentner, San Francisco, CA (US); David Jack Ovadia, Danville, CA (US); Rohit Deep, Union City, CA (US)

(73) Assignee: Cisco Technology, Inc., San Jose, CA (US)

(*) Notice: Subject to any disclaimer, the term of this patent is extended or adjusted under 35 U.S.C. 154(b) by 111 days.

(21) Appl. No.: 13/101,074

(22) Filed: May 4, 2011

(65) Prior Publication Data

US 2012/0284781 A1 Nov. 8, 2012

(51) Int. Cl.
*G06F 7/04* (2006.01)

(52) U.S. Cl.
USPC .............................................. 726/22; 726/26

(58) Field of Classification Search
USPC ..................................................... 726/22, 26
See application file for complete search history.

(56) References Cited

U.S. PATENT DOCUMENTS

| 8,069,210 | B2* | 11/2011 | Gillum et al. | 709/206 |
|---|---|---|---|---|
| 2006/0270478 | A1* | 11/2006 | Barhydt et al. | 463/41 |
| 2008/0141029 | A1* | 6/2008 | Culver | 713/165 |
| 2010/0180216 | A1* | 7/2010 | Bates et al. | 715/757 |
| 2011/0251892 | A1* | 10/2011 | Laracey | 705/14.51 |
| 2012/0089744 | A1* | 4/2012 | Yost | 709/245 |

* cited by examiner

*Primary Examiner* — Christopher Brown
(74) *Attorney, Agent, or Firm* — Patterson & Sheridan, LLP (57) ABSTRACT

A computer-implemented method is disclosed. The method involves: providing to a first client computing device a first instance of a first software program that includes a first secret ID value; receiving a first account creation request that includes the first secret ID value; associating the first account creation request with the first client computing device; and approving the first account creation request and creating a first account for the first client computing device if less than a first threshold of previous account creation requests that include the first secret ID value have been previously received, and a presumption that the first client computing device is a spammer does not apply; or denying the first account creation request if either the number of previously received account creation requests that include the first secret ID value is equal to or greater than the first threshold, or the presumption that the first client computing device is a spammer applies.

16 Claims, 7 Drawing Sheets

SYSTEM AND METHOD FOR USER FRIENDLY DETECTION OF SPAMMERS

BACKGROUND

1. Technical Field

The present invention relates generally to computer network security and, more specifically, to a system and method for user friendly detection of spammers.

2. Description of the Related Art

During the last decade, many different approaches for sharing photographic, audio, and video content over a network have been developed. Content sharing portals implementing these approaches are convenient because the portals allow users to easily share data with others. However, content sharing portals are also used by automated spammers to send junk messages to many different email addresses. The spammers harm the brand of the service provider and are costly, in terms of time and resources, to the end-users and service providers of email addresses.

To prevent spammers from accessing content sharing services, many content sharing portals require users to solve a CAPTCHA ("Completely Automated Public Turing test to tell Computers and Humans Apart") or reverse-Turing problem, a problem that is solvable by a human but not by a machine, as part of the registration process. An exemplary CAPTCHA problem asks a user to decipher a word written in warped text having a distorted background. Theoretically, any adult human computer user can solve a CAPTCHA problem, but a machine cannot do so in a reasonable amount of time.

The CAPTCHA/reverse-Turing approach has been effective in preventing many spammers from accessing content sharing portals. However, this approach suffers from several drawbacks. First, CAPTCHA problems are not user-friendly to the degree that CAPTCHA problems add an extra step to the registration process and require mental effort. Second, due to improvements in processing speed and artificial intelligence technologies, machines are now able to solve many traditionally-reverse-Turing problems, thereby rendering these reverse-Turing tests obsolete and allowing spammers to register with content sharing portals implementing these tests.

As the foregoing illustrates, what is needed in the art is a more user-friendly and more effective technique for identifying spammers.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

In the following description, numerous specific details are set forth to provide a more thorough understanding of various example embodiments of the invention. However, it will be apparent to one of skill in the art that certain embodiments of the invention may be practiced without one or more of these specific details. In other instances, well-known features have not been described in order to avoid obscuring the invention.

Overview

One embodiment of the present invention sets forth a method for preventing a spammer from creating an account. The method involves providing to a first client computing device a first instance of a first software program that includes a first secret ID value; receiving a first account creation request that includes the first secret ID value; and associating the first account creation request with the first client computing device. The method also involves approving the first account creation request and creating a first account for the first client computing device if less than a first threshold of previous account creation requests that include the first secret ID value have been previously received, and a presumption that the first client computing device is a spammer does not apply; or denying the first account creation request if either the number of previously received account creation requests that include the first secret ID value is equal to or greater than the first threshold, or the presumption that the first client computing device is a spammer applies.

One advantage of the disclosed method is that the method provides a more user-friendly and efficient approach for spammer identification. As a result, users of content sharing portals and similar services are able to enjoy the benefit of an environment with relatively few spammers while not having to waste time and mental energy to solve non-user-friendly CAPTCHA or reverse-Turing problems.

DETAILED DESCRIPTION OF THE FIGURES

Figure 1:
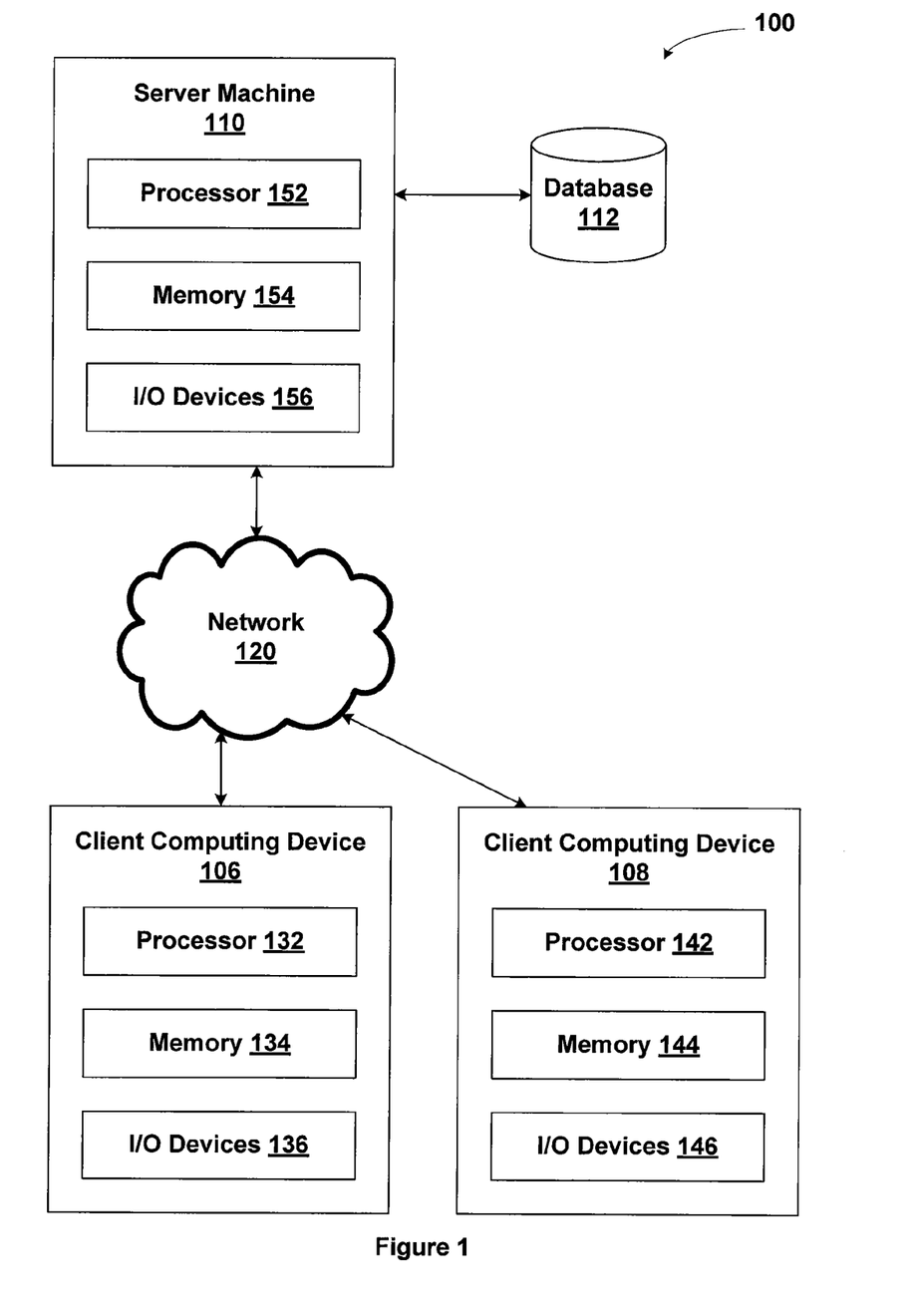
FIG. 1 illustrates an example computing system configured to implement one or more aspects of the present invention.

FIG. 1 illustrates an example computing system 100 configured to implement one or more aspects. As shown, the computing system 100 includes a server machine 110, a database 112, a plurality of client computing devices 106 and 108, and a network 120.

The server machine 110 is configured to provide data to the client computing devices 106 and 108 and to store information. The server machine includes a processor 152, a memory 154, and input/output (I/O) devices 156. The server machine is coupled with a database 112, which stores data. As is well understood, in one embodiment, there may be one server machine 110 or a plurality of server machines 110 and a plurality of databases 112.

Network 120 facilitates communication between the server machine 110 and the client computing devices 106 and 108. In one embodiment, network 120 is the Internet.

Client computing device 106 includes a processor 132, a memory 134, and I/O devices 136. In various embodiments, client computing device 106 may be a laptop computer, a desktop computer, a mobile phone, a personal digital assistant (PDA), a personal digital music/MP3 player or any other type of computing device configured to perform the functions and operations contemplated herein. Client computing device 108 similarly includes processor 142, memory 144, and I/O devices 146.

Figure 2A:
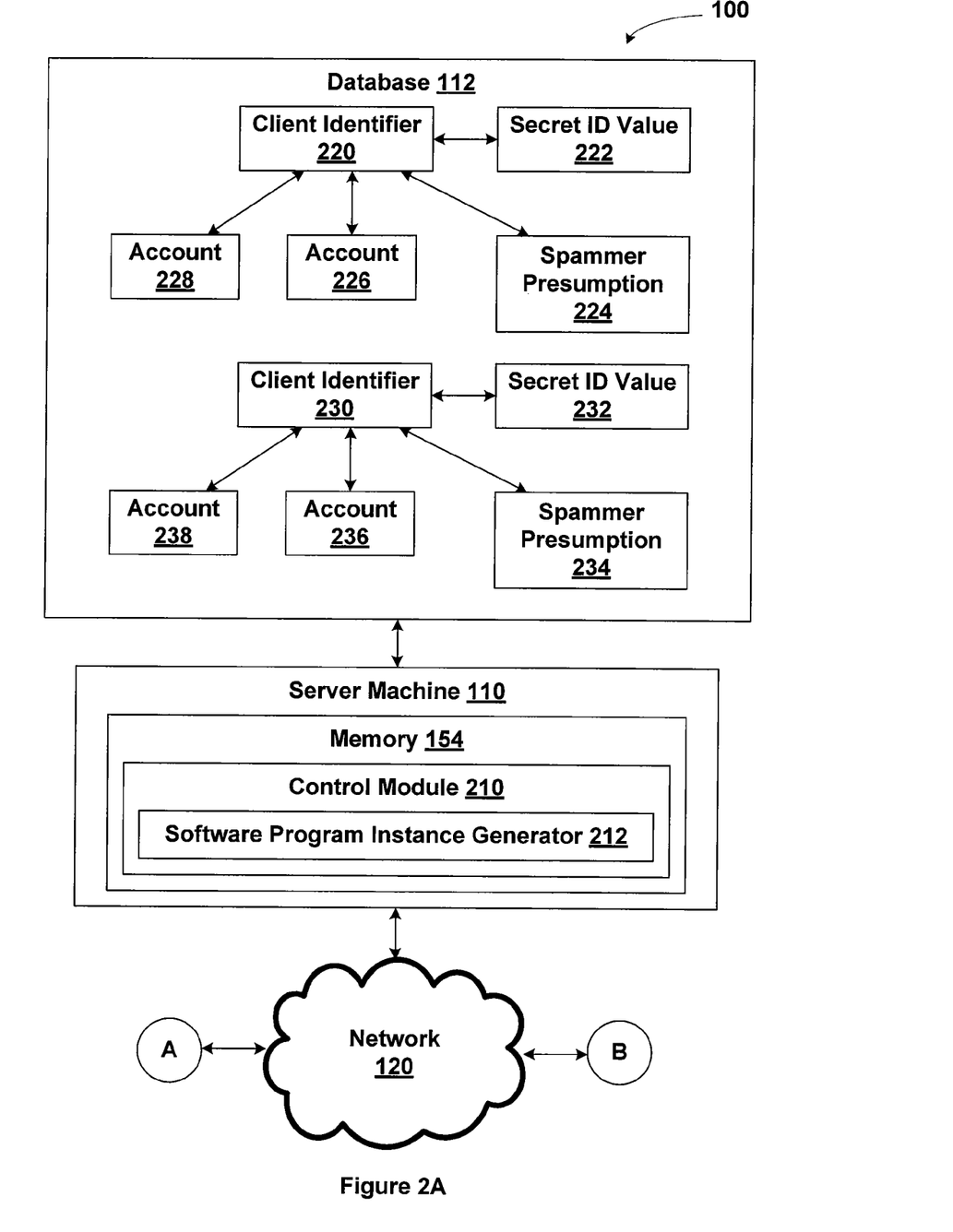
FIGS. 2A and 2B illustrate a more detailed view of data stored on a database, a server machine, and client computing devices, according to one example embodiment of the present invention.
Figure 2B:
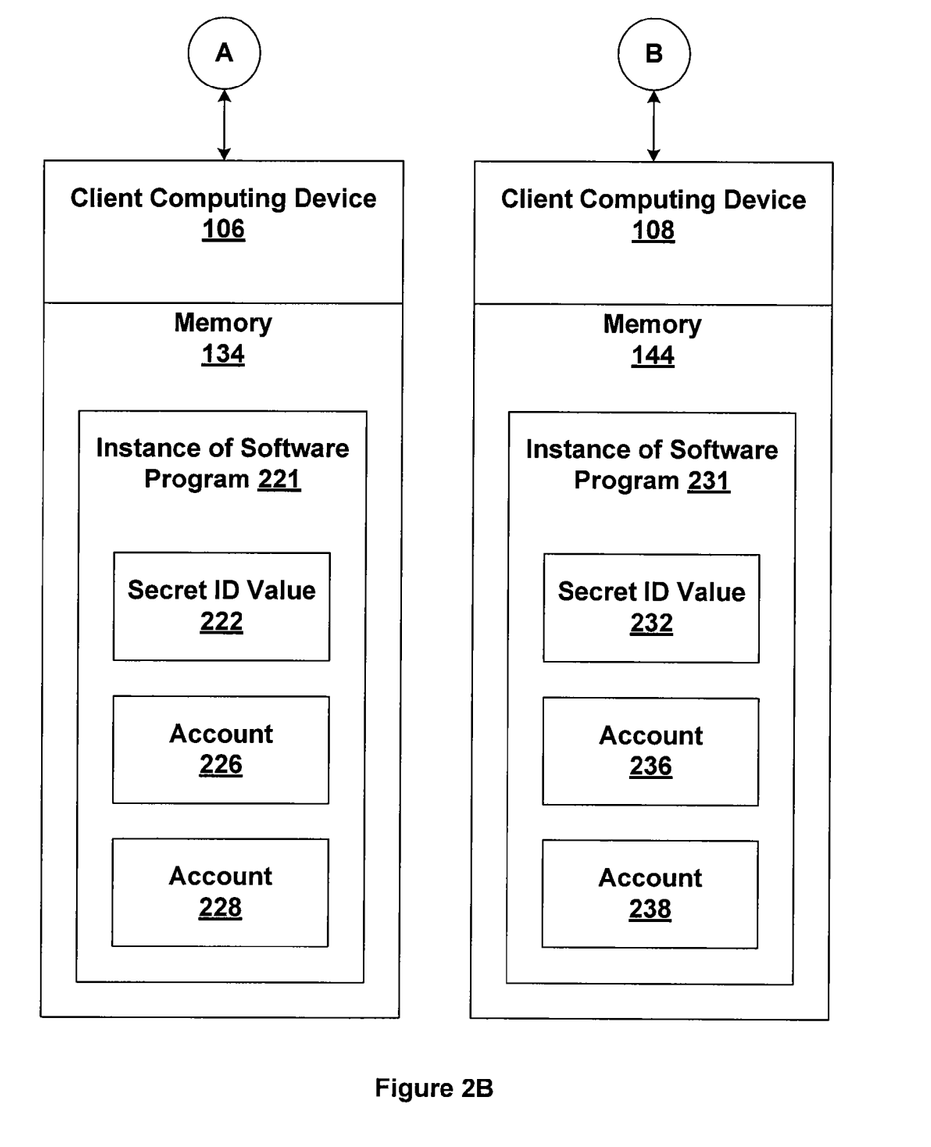

FIGS. 2A and 2B illustrate a more detailed view of data stored on the database 112, the server machine 110, and the client computing devices 106 and 108, according to one example embodiment. As also illustrated in FIG. 1, the computing system 100 includes a server machine 110, a database 112, a plurality of client computing devices 106 and 108, and a network 120.

The server machine 110 includes a memory 154, which includes a control module 210. The control module 210 is configured to communicate with the database 112 and the client devices 106 and 108 to implement the techniques of spammer detection and spam prevention discussed herein. The control module 210 includes a software program instance generator 212. In one embodiment, the software program instance generator 212 is configured to generate a program that, when executed on a client computing device 106 or 108, causes the client computing device 106 or 108 to install an instance of a software program that allows the client computing device to share data via a content sharing portal. In one embodiment, the software program instance generator 212 is also configured to notify the database 112 whenever the software program instance generator 212 generates a new instance of the program for a client computing device 106 or 108.

According to one embodiment, the client computing device 106 has a memory 134. The memory 134 stores, among other things, an instance of the software program 221 associated with the software program instance generator 212 on the server machine 110. In one embodiment, the instance of the software program 221 includes a secret identifier (ID) value 222 and one or more accounts 226 and 228. The secret ID value 222 is uniquely associated with the instance of the software program 220 and serves to identify the instance of the software program. According to one embodiment, the secret ID value 222 is stored in an encrypted and non-modifiable block of the instance of the software program 221 on the client computing device 106. In one embodiment, each account 226 or 228 is associated with a user of client computing device 106 and allows the user to share data via a content sharing portal. In one embodiment, the user is either a personal or a business user and the data comprises media, such as photographs and videos. According to one embodiment, the client computing device 108, similarly, has a memory 144. The memory 144 includes an instance of the software program 231 associated with the software program instance generator 212. The instance of the software program 231 includes a secret ID value 232 and/or one or more accounts 236 and 238.

According to one embodiment, the database includes one or more client identifiers 220 and 230. Each client identifier 220 or 230 identifies a client on which an instance of the software program has been installed by software program instance generator 212. As shown, client identifier 220 is associated with a secret ID value 222, a spammer presumption 224, and one or more accounts 226 and 228. The secret ID value 222 is also stored in the instance of the software program 221 on the client computing device 106, serving to uniquely identify the client computing device 106 and to associate the client computing device 106 with the client identifier 220. The client identifier 220 is also associated with the one or more accounts 226 and 228 created by the instance of the software program 221 on the client computing device 106 associated with the client identifier 220. Furthermore, the client identifier 220 is associated with a spammer presumption 224, which represents whether the client computing device 106 associated with the client identifier 220 is a spammer. In one embodiment, the spammer presumption 224 is a Boolean value that is initially set to a representation that the client computing device 106 associated with the client identifier 220 is not a spammer (is set to FALSE). However, the client computing device 106 associated with the client identifier 220 and other computers in the network 120 may take certain actions that cause the spammer presumption 224 to change, as explained in detail in the discussion of FIG. 4 below. Client identifier 230 is similarly associated with secret ID value 232, spammer presumption 234, and accounts 236 and 238, all of which correspond to client computing device 108.

Figure 3A:
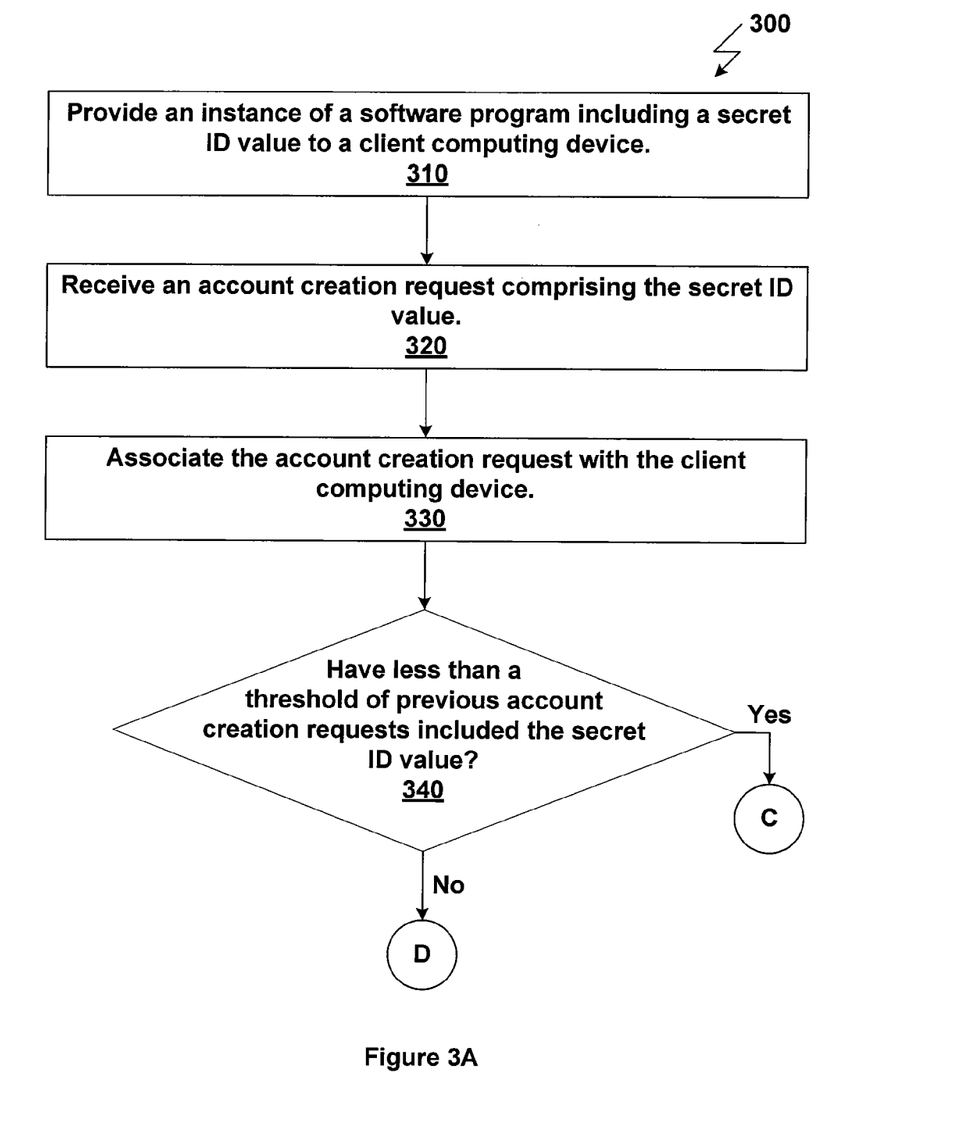
FIGS. 3A and 3B set forth a flow diagram of method steps for creating a new account for a client computing device on a server machine, according to one example embodiment of the present invention.
Figure 3B:
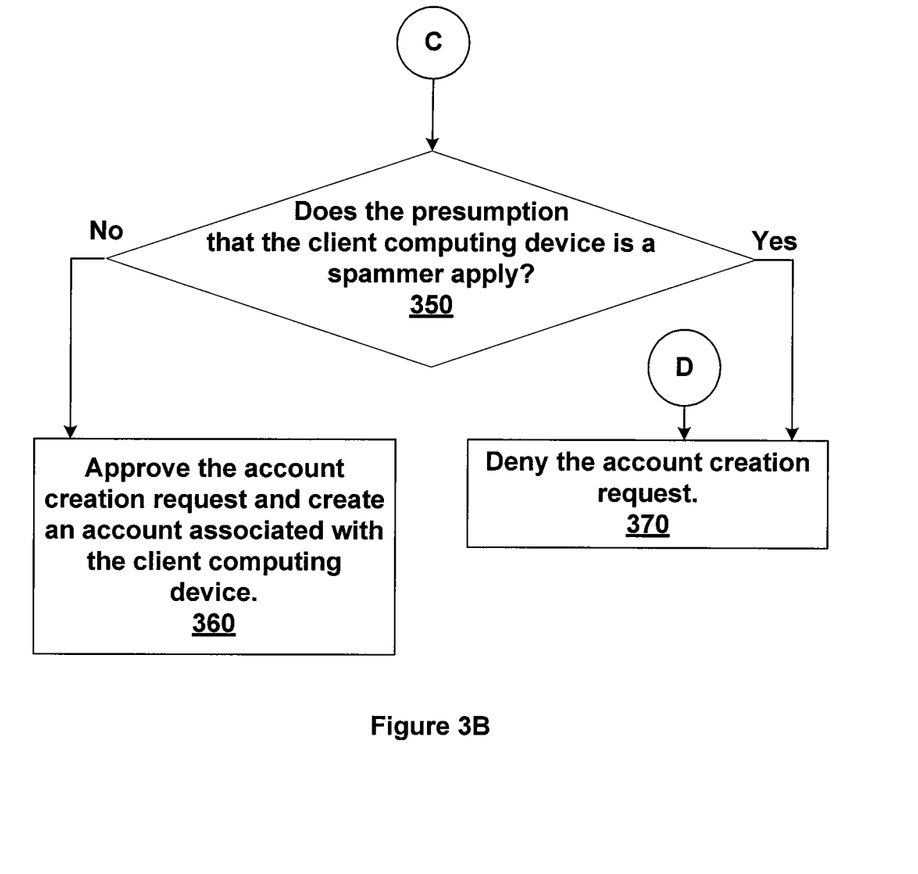

FIG. 3 is a flow diagram of method steps for creating a new account for a client computing device 106 on a server machine 110, according to one example embodiment. Although the method steps are described in conjunction with FIGS. 1-2, persons skilled in the art will understand that any system configured to perform the method steps, in any order, falls within the scope of the present invention.

The method 300 begins at step 310 where the software program instance generator 212 in the control module 210 of the server machine 110 provides the instance of the software program 221 including a secret ID value 222 to the client computing device 106. In one embodiment, the software program comprises a program for accessing a content sharing portal, such as a media sharing service.

The method 300 then continues to step 320, where the control module 210 receives an account creation request comprising the secret ID value 222. In one embodiment, the account creation request is received at the server machine 110 in an encrypted form, and is subsequently decrypted by the control module 210. In response, at step 330, the control module 210 associates the account creation request with the client computing device 106. In one embodiment, the association of the account creation request to the client computing device 106 is based on the secret ID value 222.

The method 300 then continues to step 340, where the control module 210 determines whether the number of previous account creation requests that included the secret ID value 222 is less than a pre-determined threshold.

If the control module 210 determines that the number of previous account creation requests that included the secret ID value 222 is greater than the pre-determined threshold, then the method 300 proceeds to step 370. At step 370, the control module 210 denies the account creation request. After step 370, the method 300 ends.

However, if the control module 210 determines that the number of previous account create requests that included the secret ID value 222 is less than the pre-determined threshold, then the method 300 proceeds to step 350. At step 350, the control module 210 determines, based on the spammer presumption 224, whether the client computing device 106 is likely to be controlled by a spammer. In one embodiment, the spammer presumption 224 associated with the client computing device 106 is a Boolean value that is initially set to not apply (is set to FALSE), but may be changed based on additional information about the client computing device 106 or the accounts 226 and 228 associated with the client computing device 106, as described in detail in conjunction with FIG. 4 below. However, persons skilled in the art would recognize other techniques that can be used to implement the spammer presumption 224. A more detailed discussion about how the spammer presumption 224 is set and modified is provided below in conjunction with FIG. 4.

If the spammer presumption 224 indicates that the client computing device 106 is not likely to be controlled by a spammer (is set to FALSE), then the method 300 proceeds to step 360, where the control module 210 approves the account creation request and creates an account 226 associated with the client computing device 106. In one embodiment, a representation of the account is stored in the database 112. In another embodiment, a representation of the account is stored in the client computing device 106. After step 360, the method 300 ends.

If the spammer presumption indicates that the client computing device 106 is likely to be controlled by a spammer (is set to TRUE), then the method 300 proceeds to step 370, as described above.

Figure 4A:
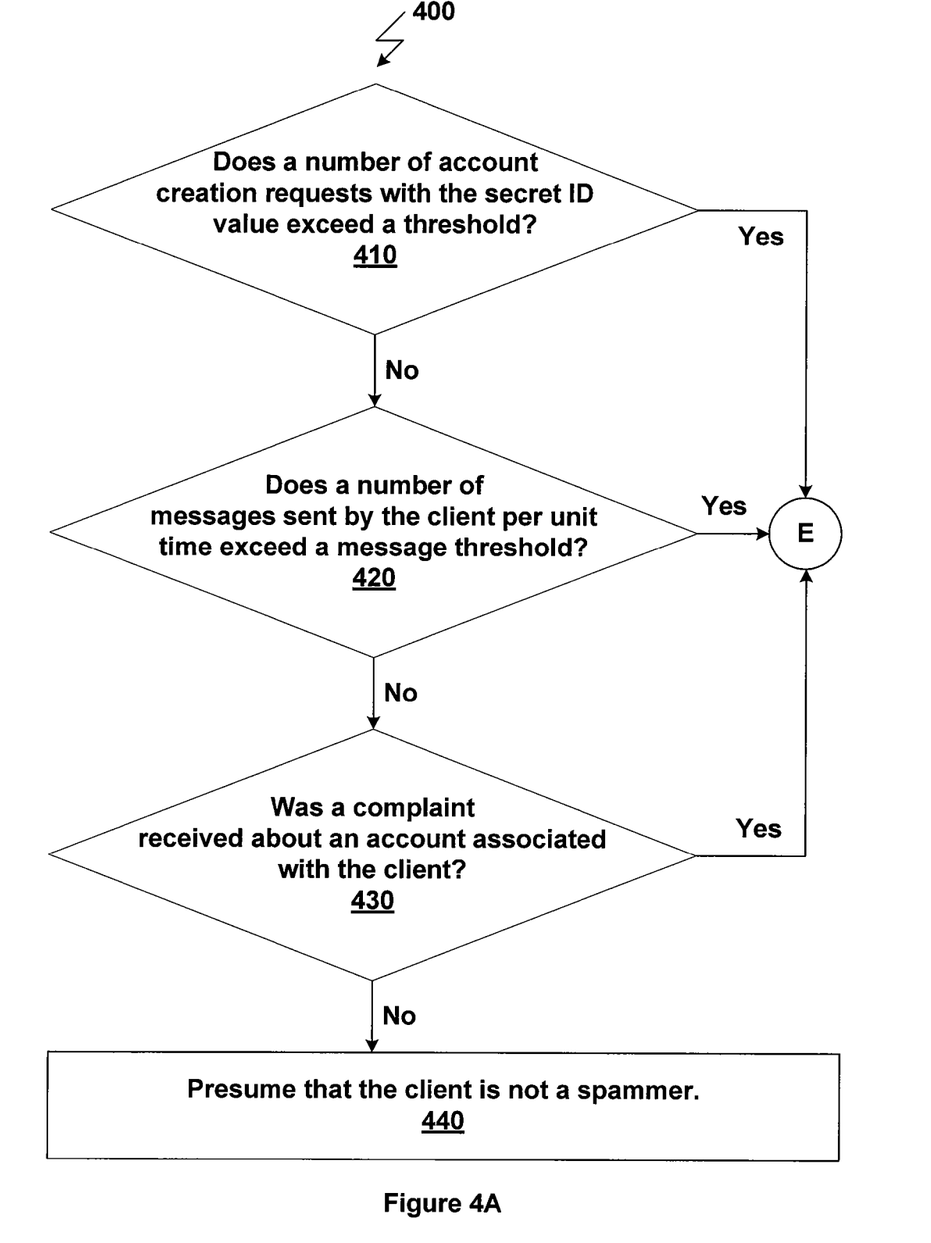
FIGS. 4A and 4B set forth a flow diagram of method steps for creating or rebutting a presumption that a client computing device is a spammer, according to one example embodiment of the present invention.
Figure 4B:
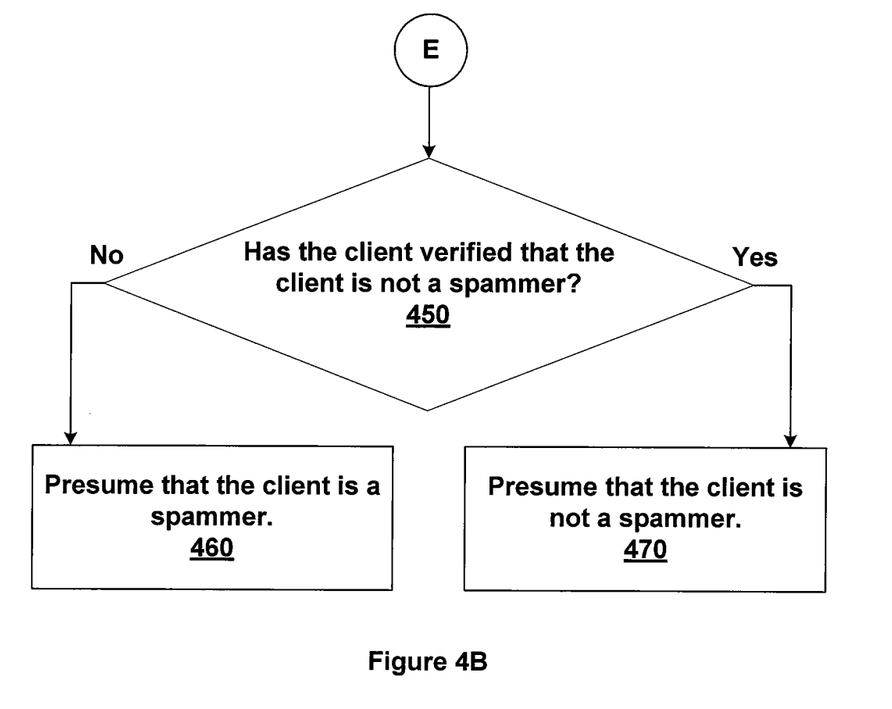

FIG. 4 is a flow diagram of method steps for setting the value of and changing the spammer presumption 224 that indicates whether the client computing device 106 is likely to be controlled by a spammer, according to one example embodiment. Although the method steps are described in conjunction with FIGS. 1-2, persons skilled in the art will understand that any system configured to perform the method steps, in any order, falls within the scope of the present invention.

The method 400 begins at step 410, where the control module 210 determines whether a number of account creation requests that include the secret ID value 222 exceeds a pre-determined threshold. As is well-known, spammers tend to create a larger number of accounts than other users. If a number of account creation requests that include the secret ID value 222 exceeds a threshold, then the method 400 proceeds to step 450, as described below.

Otherwise, the method 400 continues to step 420, where the control module 210 determines whether a number of messages sent by the client computing device 106 exceeds a message threshold. As is well-known, spammers tend to send a larger number of messages per unit time than other users. If the number of messages sent by the client computing device 106 exceed the message threshold, then the method 400 proceeds to step 450, as described below.

Otherwise, the method 400 continues to step 430, where the control module 210 determines whether a complaint has been received about an account 226 or 228 associated with the client computing device 106. If such a complaint has been received, then the method 400 proceeds to step 450, as described below.

Otherwise, at step 440, the control module concludes that the client computing device 106 is not likely to be a spammer and changes the value of spammer presumption 224 accordingly. In one embodiment, the Boolean value FALSE is stored in the spammer presumption 224 to indicate this conclusion. After step 440, the method 400 ends.

If either (1) the number of account creation requests that include the secret ID value 222 exceeds the pre-determined threshold, (2) the number of messages sent by the client computing device 106 exceeds the message threshold or (3) a complaint has been received about an account 226 or 228 associated with the client computing device 106, then the method 400 proceeds to step 450. At step 450, the control module 210 asks the client computing device 106 to verify that the client computing device 106 is not a spammer. In one embodiment, this verification is accomplished via a traditional reverse-Turing or CAPTCHA test. However, persons skilled in the art would recognize that other verification techniques could be implemented. For example, a user of the client computing device 106 could be asked to dial a telephone number and speak with an operator.

If the client computing device 106 fails to verify that the client computing device 106 is not a spammer, then the method 400 proceeds to step 460. At step 460, the control module presumes that the client computing device 106 is a spammer. In one embodiment, the Boolean value TRUE is stored in the spammer presumption 224 to indicate this conclusion. After step 460, the method 400 ends.

However, if the client computing device 106 successfully indicates that the client computing device 106 is not a spammer, then the method 400 proceeds to step 470. At step 470, the control module presumes that the client computing device 106 is not a spammer. In one embodiment, the Boolean value FALSE is stored in the spammer presumption 224 to indicate this conclusion. After step 470, the method 400 ends.

As persons skilled in the art would understand, once a client computing device 106 is presumed to be a spammer (e.g., by setting the spammer presumption 224 associated with the client computing device 106 to apply/TRUE), the control module 210 could take certain actions to reduce the ability of the client computing device 106 to transmit spam. For example, the control module 210 could prevent the client computing device from creating new accounts by preventing new accounts associated with the secret ID value 222 of the client computing device 106 from being created. Additionally, the control module 210 could limit communications by accounts 226 and 228 associated with client computing device 106, or not allow accounts 226 and 228 to send any messages at all.

In sum, the disclosed techniques provide enhancements to the registration process in content sharing portals. More specifically, the techniques apply to a server machine of a content sharing portal providing a particular instance of a software program to a client computing device. The software program is associated with the content sharing portal and includes a secret ID value. The client computing device then uses the software program to send an account creation request to the server machine. The account creation request includes the secret ID value. The server machine associates this request with the client computing device based on the secret ID value. The server machine approves the account creation request and creates an account if (1) only a small number of previous account creations have been received with the secret ID value in a certain period of time and (2) the server machine does not presume that the client computing device is a spammer. Otherwise, the server machine denies the account creation request.

One advantage of the disclosed approach is that spammers are identified in a more user-friendly and efficient manner. As a result, users of content sharing portals and similar services are able to enjoy the benefit of an environment with relatively few spammers while not having to waste time and mental energy to solve non-user-friendly CAPTCHA or reverse-Turing problems.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to certain example embodiments of the present invention, other and further embodiments of the invention may be devised without departing from the basic scope thereof. Therefore, the scope of the present invention is determined by the claims that follow.

We claim:

1. A computer-implemented method to restrict fulfillment of account creation requests, the method comprising:
   providing, to a first client computing device, a first instance of the software program identified by a first instance identifier (ID) value of a plurality of instance ID values for the software program, wherein the first instance ID value is stored within an encrypted and non-modifiable block of the software program and is uniquely associated with the first instance of the software program;
   receiving a first account creation request that includes the first instance ID value;
   associating the first account creation request with the first client computing device;
   upon determining, responsive to the first account creation request, that the composite condition for spammer detection is not satisfied, approving the first account creation request and creating a first account for the first client computing device, wherein the composite condition for spammer detection includes at least three of a plurality of conditions including:
      (i) a first condition of matching requests and specifying that a threshold count of account creation requests matching the first instance ID value have been received;
      (ii) a second condition of message send rate and specifying that a threshold rate of messages sent by one or more accounts of the first client computing device is reached;
      (iii) a third condition of spam complaints and specifying that a threshold count of spam complaints pertaining to one or more accounts of the first client computing device is received from one or more entities; and
      (iv) a fourth condition of challenge-response and specifying that a threshold count of challenge-response tests are failed by the first client computing device; and upon determining, responsive to the first account creation request, that the composite condition for spammer detection is satisfied, denying the first account creation request.

2. The computer-implemented method of claim 1, wherein the composite condition for spammer detection includes at least four of the plurality of conditions, wherein the method programmatically restricts fulfillment of the first account creation request based on the composite condition for spammer detection.

3. The computer-implemented method of claim 1, wherein each client computing device is uniquely identified by a respective client identifier, wherein each instance identifier identifies a respective instance of the software program, wherein each client identifier is associated with one or more accounts created by the respective instance of the software program, wherein each client identifier is associated with a respective instance identifier, the method further comprising:
   upon determining that the composite condition for spammer detection is satisfied, limiting communication by all accounts associated with the first client computing device.

4. The computer-implemented method of claim 3, wherein limiting communication by all accounts associated with the first client computing device includes precluding any messages from being sent from all such accounts.

5. The computer-implemented method of claim 1, wherein the first instance ID value in the first account creation request is itself encrypted;
   wherein the first account creation request is approved upon determining that the first condition of matching requests, the second condition of message send rate, and the third condition of spam complaints are false;
   wherein the first account creation request is approved upon determining that: the first condition of matching requests is false, at least one of the second condition of message send rate and the third condition of spam complaints is true, and the fourth condition of challenge-response is false;
   wherein the first account creation request is denied upon determining that the first condition of matching requests is true;
   wherein the first account creation request is denied upon determining that: the first condition of matching requests is false, at least one of the second condition of message send rate and the third condition of spam complaints is true, and the fourth condition of challenge-response is true.

6. A non-transitory computer-readable medium storing instructions that, when executed by a processing unit, cause the processing unit to perform the steps of:
   providing, to a first client computing device, a first instance of the software program identified by a first instance identifier (ID) value of a plurality of instance ID values for the software program, wherein the first instance ID value is stored within an encrypted and non-modifiable block of the software program and is uniquely associated with the first instance of the software program;
   receiving a first account creation request that includes the first instance ID value;
   associating the first account creation request with the first client computing device;
   upon determining, responsive to the first account creation request, that the composite condition for spammer detection is not satisfied, approving the first account creation request and creating a first account for the first client computing device, wherein the composite condition for spammer detection includes at least three of a plurality of conditions including:
      (i) a first condition of matching requests and specifying that a threshold count of account creation requests matching the first instance ID value have been received;
      (ii) a second condition of message send rate and specifying that a threshold rate of messages sent by one or more accounts of the first client computing device is reached;
      (iii) a third condition of spam complaints and specifying that a threshold count of spam complaints pertaining to one or more accounts of the first client computing device is received from one or more entities; and
      (iv) a fourth condition of challenge-response and specifying that a threshold count of challenge-response tests are failed by the first client computing device; and
   upon determining, responsive to the first account creation request, that the composite condition for spammer detection is satisfied, denying the first account creation request.

7. The computer-readable medium of claim 6, wherein the composite condition for spammer detection includes at least four of the plurality of conditions.

8. The computer-readable medium of claim 6, wherein each client computing device is uniquely identified by a respective client identifier, wherein each instance identifier identifies a respective instance of the software program, wherein each client identifier is associated with one or more accounts created by the respective instance of the software program, wherein each client identifier is associated with a respective instance identifier, further comprising:
  upon determining that the composite condition for spammer detection is satisfied, limiting communication by all accounts associated with the first client computing device.

9. The computer-readable medium of claim 6, wherein limiting communication by all accounts associated with the first client computing device includes precluding any messages from being sent from all such accounts, wherein the instructions programmatically restrict fulfillment of the first account creation request based on the composite condition for spammer detection.

10. The computer-readable medium of claim 6, wherein the first instance ID value in the first account creation request is itself encrypted;
  wherein the first account creation request is approved upon determining that the first condition of matching requests, the second condition of message send rate, and the third condition of spam complaints are false;
  wherein the first account creation request is approved upon determining that: the first condition of matching requests is false, at least one of the second condition of message send rate and the third condition of spam complaints is true, and the fourth condition of challenge-response is false;
  wherein the first account creation request is denied upon determining that the first condition of matching requests is true;
  wherein the first account creation request is denied upon determining that: the first condition of matching requests is false, at least one of the second condition of message send rate and the third condition of spam complaints is true, and the fourth condition of challenge-response is true.

11. A system, comprising:
  one or more computer processors; and
  a memory containing a program, which, when executed by the one or more computer processors, performs an operation, the operation comprising:
    providing, to a first client computing device, a first instance of the software program identified by a first instance identifier (ID) value of a plurality of instance ID values for the software program, wherein the first instance ID value is stored within an encrypted and non-modifiable block of the software program and is uniquely associated with the first instance of the software program;
    receiving a first account creation request that includes the first instance ID value;
    associating the first account creation request with the first client computing device;
    upon determining, responsive to the first account creation request, that the composite condition for spammer detection is not satisfied, approving the first account creation request and creating a first account for the first client computing device, wherein the composite condition for spammer detection includes at least three of a plurality of conditions including:
      (i) a first condition of matching requests and specifying that a threshold count of account creation requests matching the first instance ID value have been received;
      (ii) a second condition of message send rate and specifying that a threshold rate of messages sent by one or more accounts of the first client computing device is reached;
      (iii) a third condition of spam complaints and specifying that a threshold count of spam complaints pertaining to one or more accounts of the first client computing device is received from one or more entities; and
      (iv) a fourth condition of challenge-response and specifying that a threshold count of challenge-response tests are failed by the first client computing device; and
    upon determining, responsive to the first account creation request, that the composite condition for spammer detection is satisfied, denying the first account creation request.

12. The system of claim 4, wherein the first client computing device further includes the first account.

13. The system of claim 4, wherein the composite condition for spammer detection includes at least four of the plurality of conditions, wherein the operation programmatically restricts fulfillment of the first account creation request based on the composite condition for spammer detection.

14. The system of claim 12, wherein each client computing device is uniquely identified by a respective client identifier, wherein each instance identifier identifies a respective instance of the software program, wherein each client identifier is associated with one or more accounts created by the respective instance of the software program, wherein each client identifier is associated with a respective instance identifier, the operation further comprising:
  upon determining that the composite condition for spammer detection is satisfied, limiting communication by all accounts associated with the first client computing device.

15. The system of claim 12, wherein limiting communication by all accounts associated with the first client computing device includes precluding any messages from being sent from all such accounts, 16. The system of claim 12, wherein the first account creation request is approved upon determining that the first condition of matching requests, the second condition of message send rate, and the third condition of spam complaints are false;
  wherein the first account creation request is approved upon determining that: the first condition of matching requests is false, at least one of the second condition of message send rate and the third condition of spam complaints is true, and the fourth condition of challenge-response is false;
  wherein the first account creation request is denied upon determining that the first condition of matching requests is true;
  wherein the first account creation request is denied upon determining that: the first condition of matching requests is false, at least one of the second condition of message send rate and the third condition of spam complaints is true, and the fourth condition of challenge-response is true.

* * * * *

UNITED STATES PATENT AND TRADEMARK OFFICE
CERTIFICATE OF CORRECTION

| | | |
|---|---|---|
| PATENT NO. | : 8,635,692 B2 | Page 1 of 1 |
| APPLICATION NO. | : 13/101074 | |
| DATED | : January 21, 2014 | |
| INVENTOR(S) | : Gentner et al. | |

It is certified that error appears in the above-identified patent and that said Letters Patent is hereby corrected as shown below:

In the Claims:

Column 10, Claim 12, Line 23, please delete "4" and insert -- 11 -- therefor;

Column 10, Claim 13, Line 25, please delete "4" and insert -- 11 -- therefor.

Signed and Sealed this
Fourteenth Day of October, 2014

Michelle K. Lee
*Deputy Director of the United States Patent and Trademark Office*